(12) United States Patent
Kim et al.

(10) Patent No.: US 7,764,967 B2
(45) Date of Patent: Jul. 27, 2010

(54) SYSTEM FOR MANAGING FREQUENCY RESOURCES IN MULTIPLE RADIO ACCESS NETWORKS AND METHOD THEREOF

(75) Inventors: Hoon Kim, Seoul (KR); Yeon-Woo Lee, Seongnam-si (KR); Sang-Boh Yun, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 997 days.

(21) Appl. No.: 11/444,108

(22) Filed: May 31, 2006

(65) Prior Publication Data

US 2006/0286986 A1 Dec. 21, 2006

(30) Foreign Application Priority Data

May 31, 2005 (KR) ................ 10-2005-0046285

(51) Int. Cl.
*H04W 72/00* (2009.01)
(52) U.S. Cl. .............. 455/450; 455/447; 455/509
(58) Field of Classification Search .............. 455/450, 455/447, 509
See application file for complete search history.

(56) References Cited

U.S. PATENT DOCUMENTS

2004/0053630 A1 3/2004 Ramos et al.

FOREIGN PATENT DOCUMENTS

| EP | 1 220 557 | 7/2002 |
|---|---|---|
| WO | WO 02/23758 | 3/2002 |
| WO | WO 02/28135 | 4/2002 |

*Primary Examiner*—Nghi H Ly
*Assistant Examiner*—Amancio Gonzalez
(74) *Attorney, Agent, or Firm*—The Farrell Law Firm, LLP (57) ABSTRACT

Disclosed is a system and method for managing frequency resources, that is, a system and method for dynamically allocating and managing frequency resources in multiple radio access networks (RAN). In multiple radio access networks, the system and method manages frequency resources in consideration of the priorities of radio access networks and the priorities of service classes of each radio access network, and manages the frequency resources through negotiation and auction for frequency resources among the radio access networks.

17 Claims, 6 Drawing Sheets

SYSTEM FOR MANAGING FREQUENCY RESOURCES IN MULTIPLE RADIO ACCESS NETWORKS AND METHOD THEREOF

PRIORITY

This application claims the benefit under 35 U.S.C. 119(a) of an application entitled "System For Managing Frequency Resource In Multiple Radio Access Networks And Method Thereof" filed in the Korean Intellectual Property Office on May 31, 2005 and assigned Ser. No. 2005-46285, the entire contents of which are incorporated herein by reference.

BACKGROUND OF THE INVENTION

1. Field of the Invention

The present invention relates to a system and method for managing frequency resources, and more particularly to a system and method for dynamically allocating and managing frequency resources under an environment of multiple radio access networks (RAN).

2. Description of the Related Art

In the fourth-generation (4G) communication system, it is expected that various radio access networks coexist, so an efficient resource management method is required. Accordingly, frequency band allocation for new services and efficient frequency resource management have emerged as hot issues.

The conventional methods for managing frequency resources in multiple radio access networks include a fixed spectrum allocation (FSA) method and a dynamic spectrum allocation (DSA) method.

According to the FSA method, frequency resources are allocated in the same ratio regardless of the loads on radio access networks. The FSA method allocates frequency resources in the same manner without taking into consideration the service characteristics. Therefore, the FSA method is inefficient in resource management.

For this reason, the DSA method measures the load on each radio access network and dynamically allocates frequency resources in proportion to the measured load so as to efficiently manage the resources. In addition, according to the DSA method, when frequency resources of requested frequency bands between radio access networks collide with each other, a specific radio access network can be given priority or a radio access network can be randomly selected to be allocated with frequency resources. However, the frequency resource allocation according to the DSA method is performed in consideration of only loads measured according to radio access networks, without taking into consideration priority between radio access networks, priority between service classes and also the possibility of negotiation between radio access networks. Accordingly, the DSA method also has difficulty in efficiently managing frequency resources.

SUMMARY OF THE INVENTION

Accordingly, the present invention has been made to solve the above-mentioned problems occurring in the prior art, and an object of the present invention is to provide a system and method for managing frequency resources in consideration of the difference between requested frequency bands in multiple radio access networks on the basis of time and space.

Another object of the present invention is to provide a system and method for managing frequency resources based on the priority of radio access networks and the priority of service classes provided for each radio access network in multiple radio access networks.

Still another object of the present invention is to provide a system and method for managing frequency resources through negotiation and auction for the frequency resources among radio access networks in multiple radio access networks.

To accomplish these objects, in accordance with one aspect of the present invention, there is provided a system for managing frequency resources under a communication environment including multiple radio access networks employing various radio access schemes, the system including local resource managers for managing load values according to service classes by each network; spectrum managers for receiving the load values according to service classes from the local resource managers of networks employing an equal radio access scheme from among the networks, calculating a sum of frequency bandwidths corresponding to the received load values, and requesting a frequency bandwidth corresponding to the sum to be allocated; and a spectrum relay apparatus for respectively calculating frequency bandwidths to be allocated to the spectrum managers for frequency bands requested from the spectrum managers in consideration of priorities of the networks and priorities of service classes of each network, and allocating frequency bandwidths to the spectrum managers through negotiation and auction among the spectrum managers according to a result of the calculation.

Preferably, the spectrum relay apparatus calculates each frequency bandwidth to be allocated to the networks in consideration of priorities of the networks and priorities of service classes of each network, when a sum of frequency bandwidths requested from the spectrum managers is larger than an entire remaining bandwidth of the spectrum relay apparatus, and reports results of the calculation to corresponding spectrum managers, respectively; instructs negotiation among the spectrum managers for a portion of the entire remaining bandwidth when the spectrum managers request an auction for frequency bandwidth allocation in response to results of the calculation, and allocates the entire remaining bandwidth to the spectrum managers according to a result of the negotiation; makes a portion of the entire remaining bandwidth available for auction to the spectrum managers when the negotiation does not reach an agreement, and allocates the entire remaining bandwidth to the spectrum managers according to a result of the auction; and allocates the frequency bandwidth to the spectrum managers according to the result of the calculation when no spectrum manager requests the auction in response to the result of the calculation.

In addition, the spectrum relay apparatus preferably manages the entire remaining bandwidth by dividing the entire remaining bandwidth into a shared frequency bandwidth and an auction frequency bandwidth, and performs the negotiation and auction for the auction frequency bandwidth when an auction is requested.

In addition, the spectrum relay apparatus preferably allocates as many frequency bandwidths as requested by the spectrum managers to corresponding spectrum managers, when the sum of the requested frequency bandwidths is smaller than the entire remaining bandwidth.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
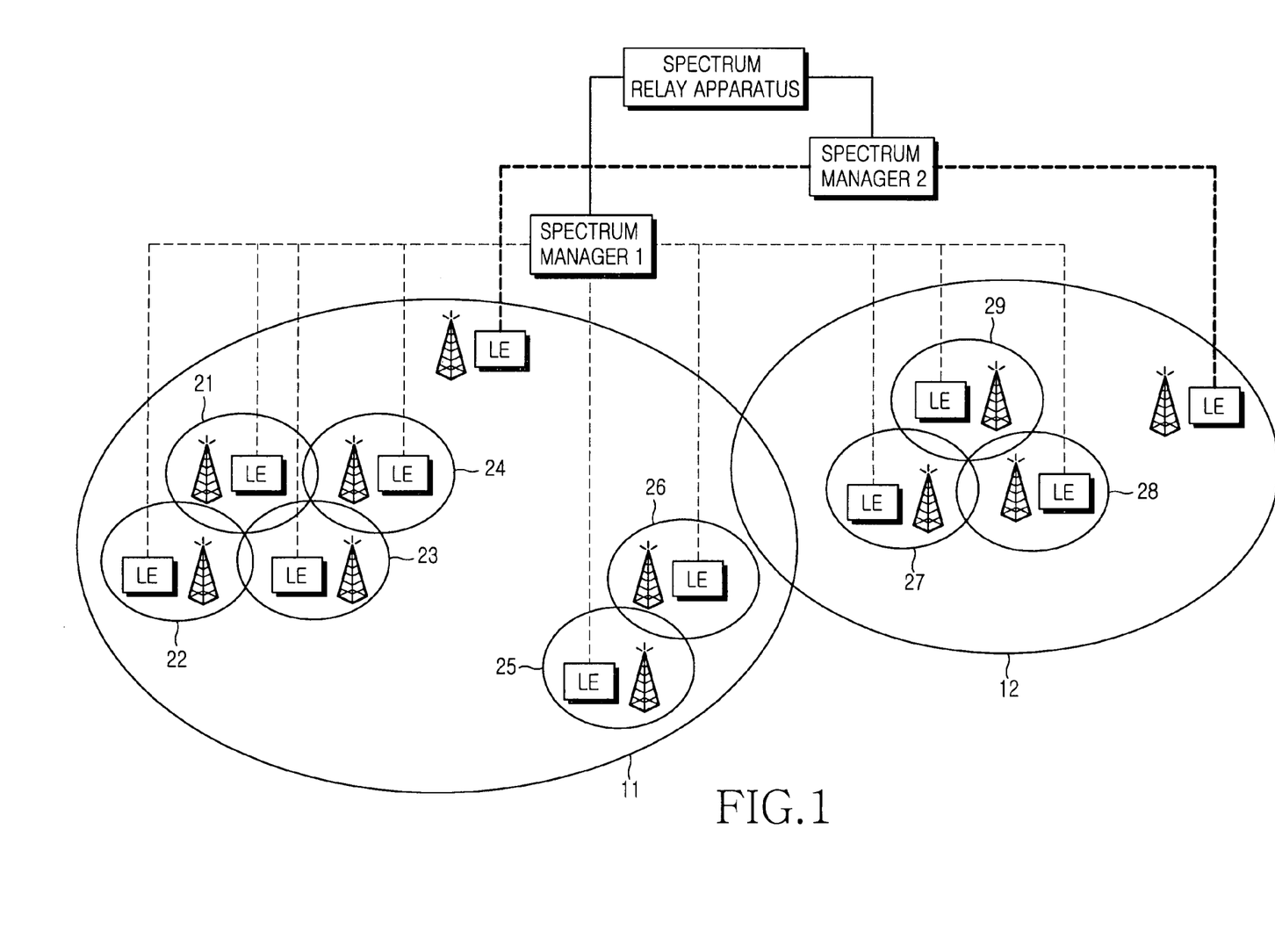
FIG. 1 is a block diagram schematically illustrating the configuration of a system for managing frequency resources in an environment including multiple radio access networks according to an embodiment of the present invention.

Hereinafter, a preferred embodiment according to the present invention will be described with reference to the accompanying drawings. In the following description of the embodiments of the present invention, a detailed description of known functions and configurations incorporated herein will be omitted when it may obscure the subject matter of the present invention. FIG. 1 is a block diagram illustrating the configuration of a system for managing frequency resources in multiple radio access networks. Networks 11 and 12 employ the same radio access scheme (e.g., mobile networks), and use frequency resources managed by spectrum manager #2. Networks 21 to 29 employ the same radio access scheme (e.g., nomadic networks), which is different from that of the networks 11 and 12, and use frequency resources managed by spectrum manager #1. Both the spectrum managers #1 and #2 are managed by a spectrum relay apparatus which is an upper layer.

That is, in the system for managing frequency resources according to an embodiment of the present invention, a distinct spectrum manager for managing frequency resources of networks employing the same radio access scheme is included according to each radio access scheme, and the spectrum relay apparatus for managing all of these spectrum managers is included. The configuration and the number of spectrum managers and spectrum relay apparatuses may change depending on network providers and the construction of each network.

Meanwhile, each radio access network includes a load estimator (LE), which estimates its own network load and reports the estimated load to the spectrum managers managing the load estimator.

Figure 2:
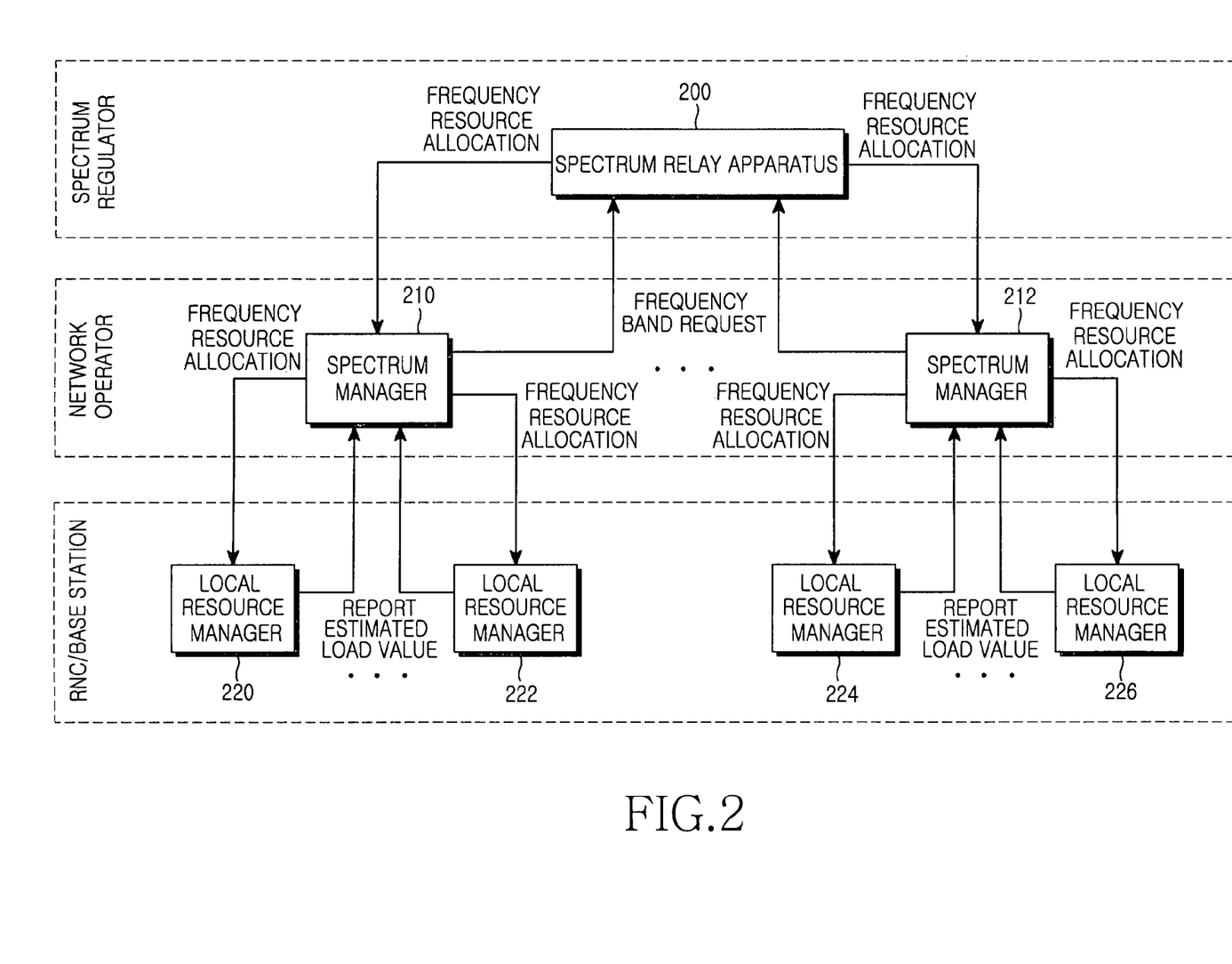
FIG. 2 is a block diagram illustrating the configuration of a frequency resource management system according to an embodiment of the present invention.

Hereinafter, the principal functions and configuration of the frequency resource management system according to an embodiment of the present invention will be described in more detail with reference to FIG. 2.

A base station or radio network controller (RNC) of each radio access network includes local resource managers 220 to 226. The local resource managers 220 to 226 allocate channels to each base station, control power, and perform various scheduling tasks and connection admission control (CAC). The local resource managers 220 to 226 have a load estimation function corresponding to the load estimator (LE) shown in FIG. 1, estimating a corresponding network load according to each service class and reporting the estimated network load to spectrum managers 210 and 212.

Each of the spectrum managers 210 and 212, which has received the estimated load values from the local resource managers 220 to 226, calculates the total frequency band required for a corresponding network managed by each spectrum manager by using all received load values. Such calculation of frequency band is performed in consideration of all bandwidths required according to service classes in each network. Each of the spectrum managers 210 and 212 determines if the frequency bands dedicated thereto are sufficient for the total frequency bands required from networks managed by the spectrum manager. As a result of the determination, when the dedicated frequency bands are insufficient for the total frequency bands required from the networks managed by the spectrum manager, a corresponding spectrum manager requests the spectrum relay apparatus 200 to allocate an additional frequency band to the corresponding spectrum manager. In addition, each of the spectrum managers 210 and 212 manages service classes of networks managed by a relevant spectrum manager itself, allocates and manages frequency resources according to the managed service classes on the basis of time and space, and manages the reuse of frequency resources and the like. It is preferred that these spectrum managers 210 and 212 are managed by a network operator.

The spectrum relay apparatus 200 allocates frequency resources for a frequency band requested from each spectrum manager 210 or 212 on the basis of the frequency allocation policy. The frequency allocation policy includes convention relationship with regard to radio access networks, priorities of radio access networks for frequency resource allocation, frequency band classification according to frequency resource uses, negotiation options for frequency resource allocation provided from each radio access network, auction options for frequency resource allocation provided from each radio access network, etc. It is preferred that such a spectrum relay apparatus 200 is managed by a spectrum regulator, which may be either a government agency for managing the entire frequency resources of the country or a chief manager for managing a plurality of radio access networks.

In summary, when the local resource managers 220 to 226 estimate and report their loads to the spectrum managers 210 and 212, each of the spectrum managers 210 and 212 calculates a total frequency band for networks managed by a relevant spectrum manager itself, by using estimated load values received from the networks managed by the relevant spectrum manager itself. Next, each of the spectrum managers 210 and 212 requests the spectrum relay apparatus 200 to allocate frequency resources corresponding to a required frequency band. Then, the spectrum relay apparatus 200 determines frequency resources to be allocated for the amount of frequency band requested from each of the spectrum managers 210 and 212, and allocates the determined frequency resources to the spectrum managers 210 and 212. The spectrum managers 210 and 212 allocate frequency resources allocated from the spectrum relay apparatus 200 to the local resource managers 220 to 226 managed by the spectrum managers 210 and 212 themselves, with reference to estimated load values of the local resource managers 220 to 226. Each of the local resource managers 220 to 226 transmits various data and controls the transmission by using allocated frequency resources.

As described above, the spectrum relay apparatus 200 manages all frequency resources and allocates frequency resources to each of the spectrum managers 210 and 212, i.e., to radio access networks. Hereinafter, a method for allocating frequency resources by the spectrum relay apparatus 200 will be described in detail.

Figure 3:
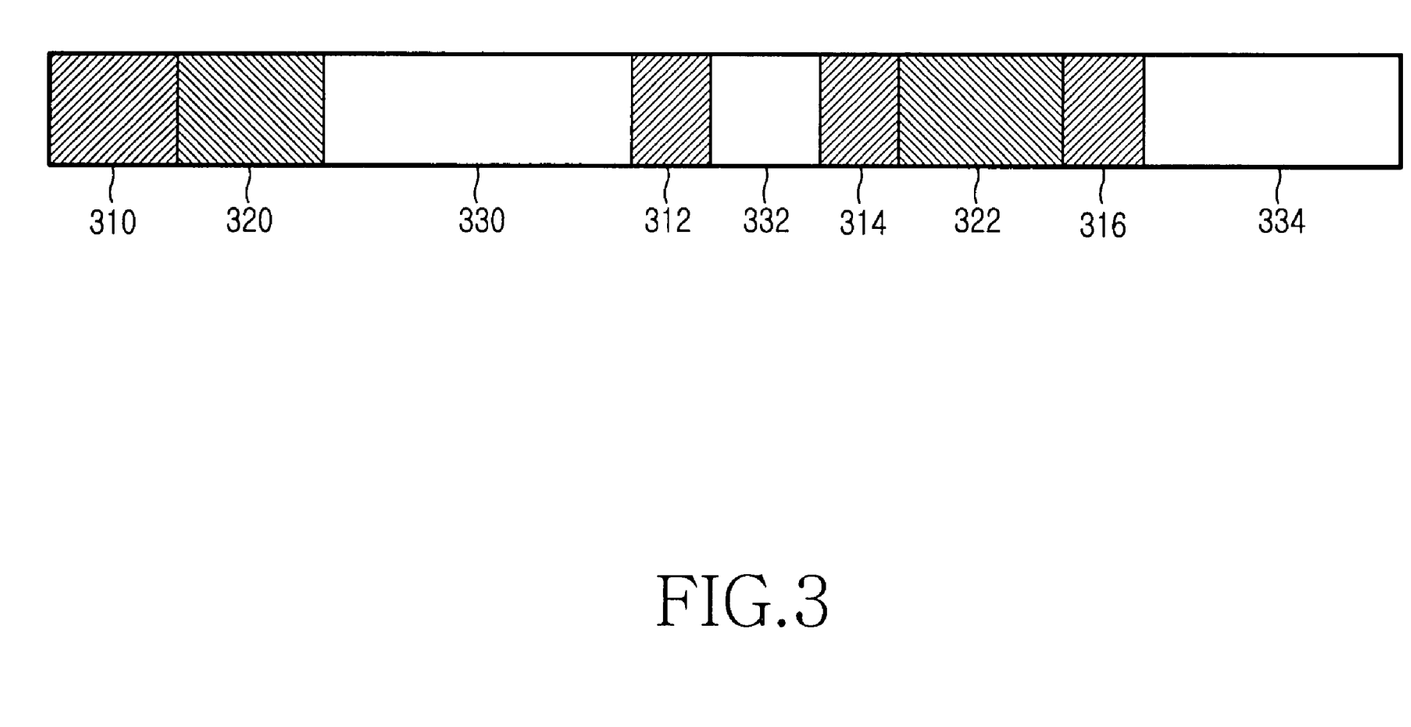
FIG. 3 is a diagram illustrating a frequency band according to an embodiment of the present invention.

The spectrum relay apparatus 200 (hereinafter, reference numeral '200' will be omitted) classifies and manages a frequency band according to frequency resource use. As shown in FIG. 3, with respect to all frequency resources, a frequency band is classified into frequency bands 310 to 316 dedicated for use by a single spectrum manager, frequency bands 330 to 334 to be shared by multiple spectrum managers in use, and auction frequency bands 320 and 322 allocated to multiple spectrum managers in a negotiation and auction manner. In this case, the number of the classified frequency bands may change depending on the number of spectrum managers and the amount of frequency band requested from each spectrum manager. Meanwhile, one radio communication provider may operate a plurality of networks employing various radio access schemes, and the networks are managed by a plurality of spectrum managers according to the sizes and configurations of their respective networks. Therefore, the spectrum relay apparatus may determine that a plurality of spectrum managers are managed by one radio access network operator, and may allocate frequency resources based on the determination. The following description will be given on the assumption that a network employing one kind of radio access scheme is managed by one spectrum manager, for convenience of description.

The dedicated frequency bands 310 to 316 are independently allocated to each spectrum manager, so the spectrum managers can freely use the dedicated frequency bands.

The shared frequency bands 330 to 334 are dynamically allocated when a spectrum manager requests allocation of frequency bands in addition to the dedicated frequency band. The spectrum relay apparatus allocates the frequency resources of the shared frequency bands in consideration of priorities and convention relationship with regard to the spectrum managers.

The auction frequency bands 320 and 322 are allocated by negotiation and auction options, when the sum of the amount of frequency band requested from multiple spectrum managers exceeds the entire bandwidth, which can be allocated by the spectrum relay apparatus, on account of keen competition between the spectrum managers. The negotiation option refers to an option for negotiating a request band and price between the spectrum relay apparatus and each spectrum manager, when the sum of the amount of frequency band requested from spectrum managers exceeds the entire bandwidth which can be allocated by the spectrum relay apparatus. The auction option refers to an option for putting the remaining frequency band of the auction frequency bands 320 and 322 up for auction to spectrum managers and providing the remaining frequency band to a successful spectrum manager, when the sum of the amount of frequency band requested from spectrum managers exceeds the entire bandwidth which can be allocated by the spectrum relay apparatus and the spectrum relay apparatus fails in negotiation with the spectrum managers. In general, the auction frequency bands 320 and 322 are included in the shared frequency bands 330 to 334 to be allocated when there is no negotiation option, but are used according to their original intention when a negotiation or auction option is performed.

Figure 4:
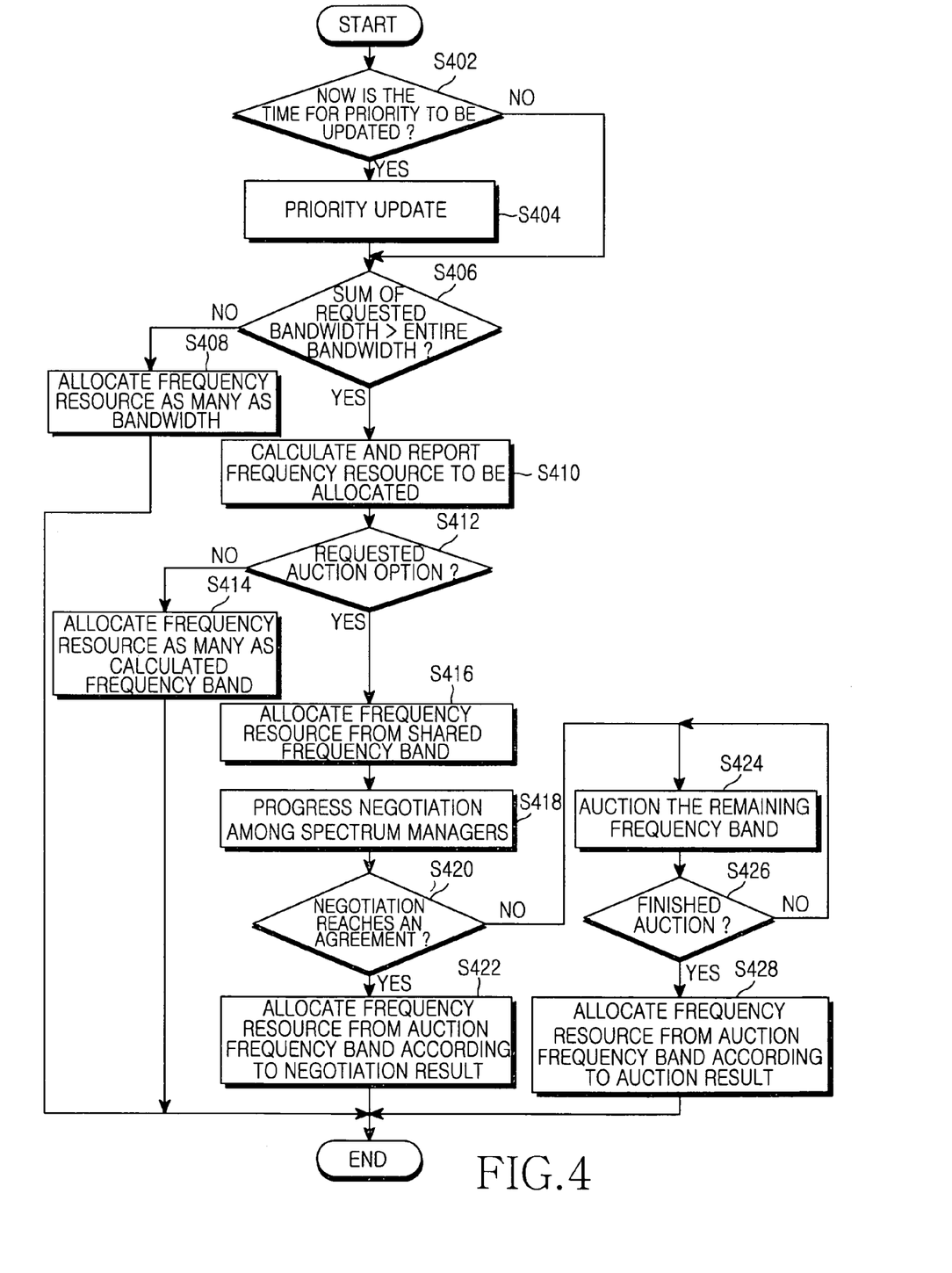
FIG. 4 is a flowchart explaining a method for allocating frequency resources according to an embodiment of the present invention.

FIG. 4 is a flowchart for explaining a method for allocating frequency resources by the spectrum relay apparatus according to an embodiment of the present invention.

In step 402, the spectrum relay apparatus determines if it is required at this point in time to update the priority of the spectrum managers for frequency resource allocation before allocating frequency resources. That is, step 402 is performed to periodically check the priorities of the radio access networks for frequency resource allocation. When it is determined that a priority update is required at this point in time, the spectrum relay apparatus updates the priorities in step 404, and then actually performs a procedure for allocating frequency resources.

In step 406, the spectrum relay apparatus determines if the sum of the frequency bands requested by the spectrum managers exceeds the entire bandwidth, which can be allocated by the spectrum relay apparatus. Herein, the amount of frequency bands requested from the spectrum managers refers to the amount of frequency bands additionally-required by a spectrum manager besides the dedicated frequency band thereof, and the entire frequency band which can be allocated by the spectrum relay apparatus includes both shared and auction frequency bands.

When the sum of the amount of frequency band requested from the spectrum managers is smaller than the entire bandwidth which can be allocated by the spectrum relay apparatus, the spectrum relay apparatus allocates the spectrum managers with frequency resources corresponding to the requested bandwidth in step 408.

In contrast, when the sum of the amount of frequency bands requested from the spectrum managers exceeds the entire bandwidth which can be allocated by the spectrum relay apparatus, the spectrum relay apparatus calculates each frequency band which can be allocated to each spectrum manager according to a spectrum sharing metric, and notifies each spectrum manager of the frequency a band calculated for the corresponding spectrum manager in step 410.

Then, each spectrum manager checks frequency resources allocated thereto. In this case, when a spectrum manager is not satisfied with the frequency resources allocated thereto, the spectrum manager requests the spectrum relay apparatus for an auction option in step 412. When no spectrum manager requests an auction option, which means that all the spectrum managers are satisfied with the frequency resources allocated thereto, the spectrum relay apparatus allocates frequency bands calculated in step 410 to each spectrum manager in step 414.

When an auction option is requested, the spectrum relay apparatus first allocates each spectrum manager with frequency resources within the shared frequency bands in step 416. Then, the spectrum relay apparatus progresses to negotiation in step 418 so that the spectrum managers negotiate to divide the auction frequency bands among them for the remaining portion not allocated among the amount of frequency bands requested from the spectrum managers.

When the negotiation reaches an agreement for the spectrum managers to be satisfied therewith in step 420, the spectrum relay apparatus allocates each spectrum manager with the frequency resources of the auction frequency band according to the result of the negotiation in step 422. In contrast, when the negotiation does not reach an agreement, the spectrum relay apparatus puts the remaining frequency bands up for auction in step 424. That is, the spectrum relay apparatus allocates the auction frequency bands through an auction. When the auction is finished in step 426, the spectrum relay apparatus allocates each spectrum manager with frequency resources of the auction frequency band according to the result of the auction in step 428.

Meanwhile, the Spectrum Sharing Metric is used for the spectrum relay apparatus to allocate the shared frequency bands (and the auction frequency bands when there is no negotiation option), and enables the spectrum relay apparatus to control the allocation of frequency resources in view of long/short term criteria when the sum of the requested frequency bandwidths received from the spectrum managers exceeds the entire bandwidth which can be allocated by the spectrum relay apparatus.

The Spectrum Sharing Metric is expressed as Equation (1):

$$B_k = R_k \frac{\sum_{j=1}^{C} \alpha_{kj} L_{kj}}{\sum_{k=1}^{N} \sum_{j=1}^{C} \alpha_{kj} L_{kj}} B_T \qquad (1)$$

Herein, $B_k$ represents a frequency bandwidth to be allocated to spectrum manager 'k'. $R_k$ represents a weight value, that is, a priority for frequency resource allocation among spectrum managers, which is controlled by the spectrum relay apparatus according to convention relationship with regard to each spectrum manager. $a_{kj}$ represents a weight value for service class 'j' of spectrum manager 'k', that is, priority for frequency resource allocation according to service classes managed by spectrum manager 'k'. $L_{kj}$ represents an estimated load for service class 'j' of spectrum manager 'k'. $B_T$ represents the entire frequency bandwidth managed by the spectrum relay apparatus, which includes dedicated frequency bands and shared frequency bands (and also may include auction frequency bands when there is no auction option). N represents the number of spectrum managers, and C represents the number of service classes managed by a corresponding spectrum manager.

Referring to Equation (1), it can be understood that the spectrum relay apparatus allocates frequency resources to each spectrum manager, by dividing the entire frequency bandwidth into the ratio of the sum of load values estimated according to service classes requested by each corresponding spectrum manager to the sum of load values estimated according to service classes requested by all spectrum managers. In this case, it can be understood that priorities according to service classes are reflected in estimated load values of each spectrum manager, and the priority for the spectrum managers is reflected in the entire frequency bandwidth, thereby allocating frequency resources.

In detail, $R_k$ is a coefficient allowing the spectrum relay apparatus to consider the long-term priority among spectrum managers. In FIG. 1, for example, when a share ratio of the spectrum manager #1 is "S1" and a share ratio of the spectrum manager #2 is "S2", a long-term share ratio between the two spectrum managers for a shared frequency band is determined as S1:S2. Actually, however, the ratio of the requested amounts of frequency bands between the spectrum managers may differ over a long period of time, and frequency bands are allocated at a different ratio depending on distribution of requested frequency bands. Therefore, the spectrum relay apparatus increases the value of $R_k$ for the spectrum manager #1 when a share ratio of frequency bands allocated to the spectrum manager #2 is larger than the portion of "S2" in "S1:S2", and decreases $R_k$ for the spectrum manager #1 when a share ratio of frequency band allocated to the spectrum manager #2 is smaller than the portion of "S2" in "S1:S2".

Meanwhile, the spectrum relay apparatus dynamically allocates the short-term shared frequency band based on the amount of frequency bands requested by the spectrum managers every time unit. Each spectrum manager periodically obtains the sum of load values estimated according to service classes by reflecting a relevant priority for each service class, and then reports the obtained sum to the spectrum relay apparatus. That is, $$\sum_{j=1}^{C} \alpha_{kj} L_{kj},$$

shown in Equation (1), represents a value reported from a corresponding spectrum manager to the spectrum relay apparatus. Then, the spectrum relay apparatus periodically checks frequency bands requested from the spectrum managers every time unit to allocate the shared frequency band.

Figure 5:
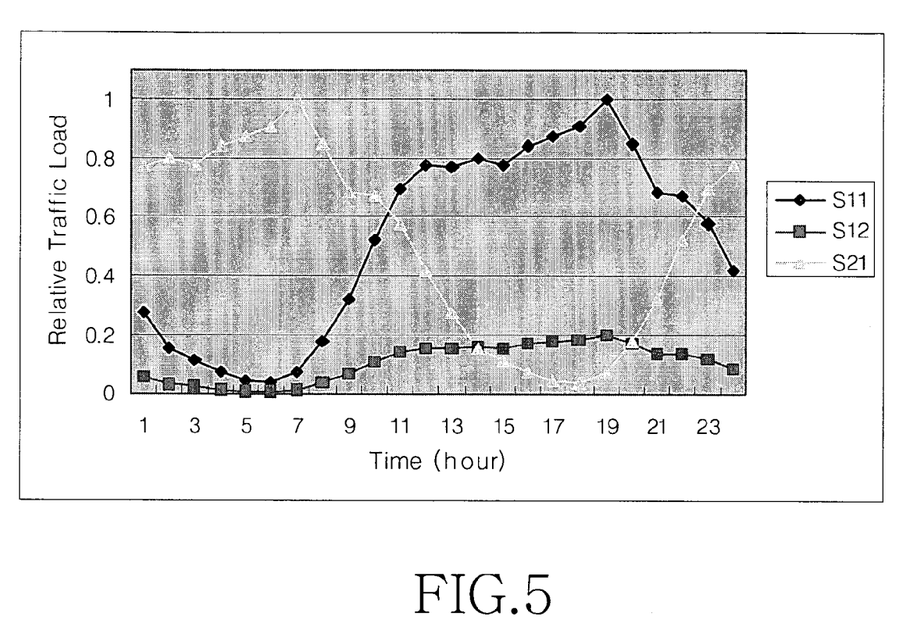
FIGS. 5 and 6 are graphs illustrating environments including multiple radio access networks in order to simulate the system according to the present invention.
Figure 6:
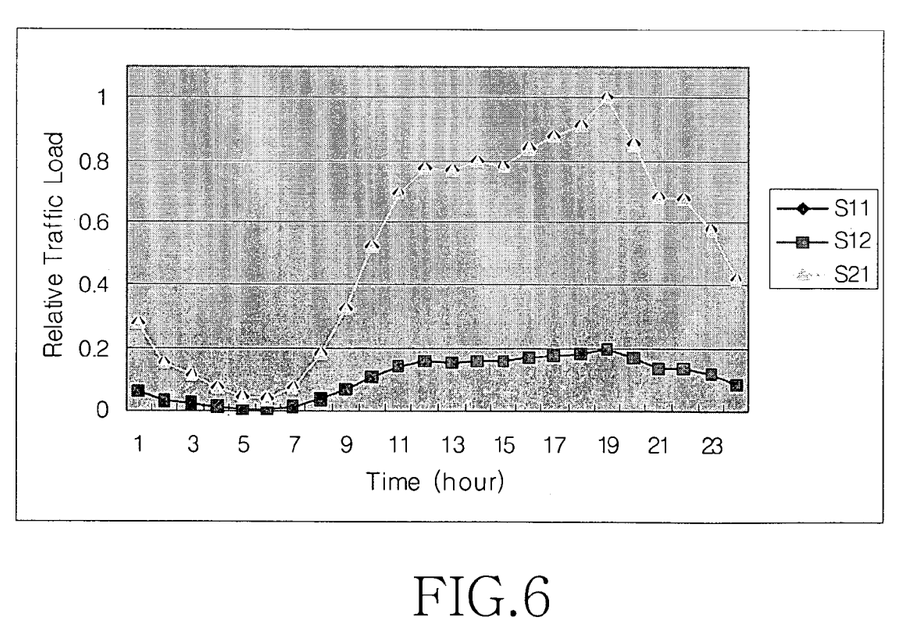

Hereinafter, the simulation results of the performance of a frequency resource management system according to the present invention under an environment of multiple radio access networks as shown in FIGS. 5 and 6 will be described. FIGS. 5 and 6 show traffic loads as a function of time for each service class, in which two service classes S11 and S12 are managed by network #1 and one service class S21 is managed by network #2. FIG. 5 shows the case in which the correlation between the two networks is small, and FIG. 6 shows the case in which the correlation between the two networks is large.

Figure 7:
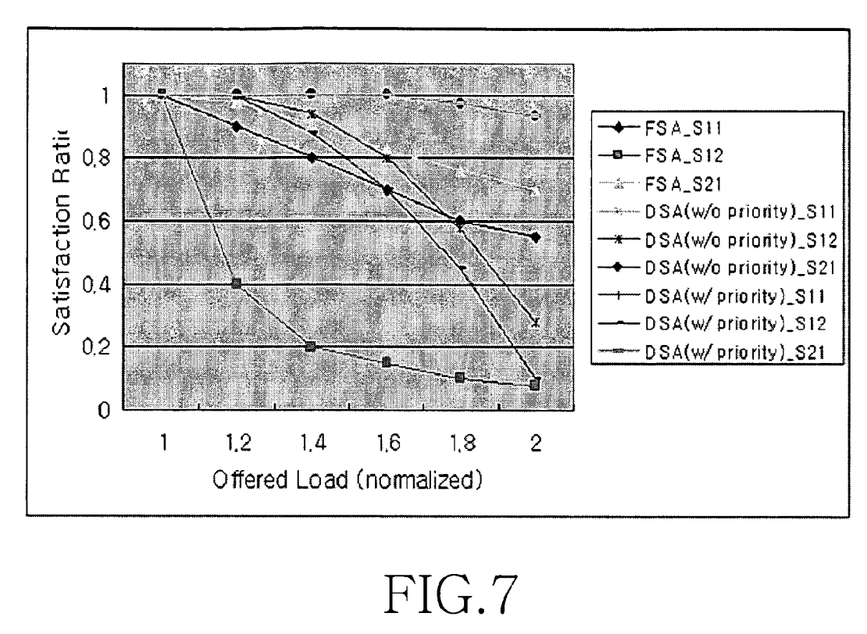
FIGS. 7 and 8 are graphs illustrating simulation results obtained by applying the present invention to the environments shown in FIGS. 5 and 6, respectively.
Figure 8:
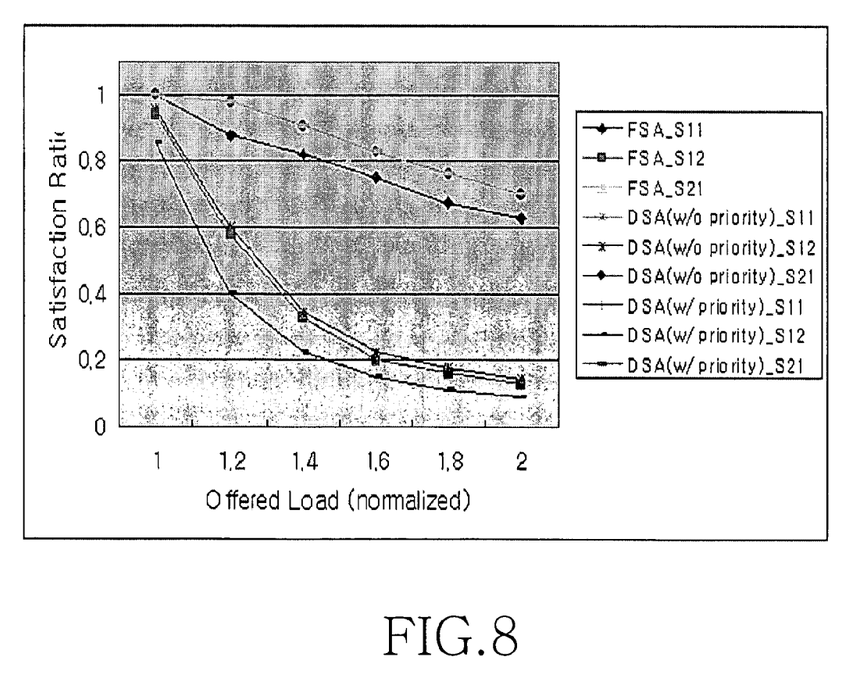

In cases shown in FIGS. 5 and 6, simulation results of satisfaction ratio of a frequency band allocated from the spectrum relay apparatus to a frequency band requested by each service class with respect to each service class are shown in FIGS. 7 and 8, respectively. That is, FIG. 7 shows a simulation result under the environment shown in FIG. 5, and FIG. 8 shows a simulation result under the environment shown in FIG. 6. In FIGS. 7 and 8, "Offered Load" represents load values estimated according to service classes, and the amount of frequency band requested corresponding to each load value is provided from the spectrum relay apparatus to a corresponding service class through the relevant spectrum manager. Also, in FIGS. 7 and 8, "FSA" refers to the case in which frequency bands are allocated to network #1 and network #2 in the ratio of 1:1 regardless of the network loads, "DSA (w/o priority)" refers to the prior case in which frequency bands are allocated proportionally to the loads on networks, and "DSA (w/ priority)" refers to the case of frequency allocation according to an embodiment of the present invention. Referring to FIG. 7, it can be understood that the present invention can provide significantly superior performance in frequency resource management to the prior art when the correlation between two networks is small. Referring to FIG. 8, it can be understood that the consideration of the priorities according to service classes significantly improves performance in frequency resource management when the correlation between two networks is large.

As described above, the system and method according to present invention provides a basic Metric for frequency resource management under an environment of multiple radio access networks in which networks employing various radio access schemes coexist, thereby dynamically allocating and managing frequency resources.

In addition, according to the system and method of the present invention, frequency resources are allocated adaptively in consideration of the priorities of radio access networks and the priorities of service classes of each network, so that resource management and system efficiency can be improved.

In addition, the system and method according to the present invention employs negotiation and auction for frequency resources among networks, thereby more efficiently managing frequency resources.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A system for managing frequency resources in a communication environment including multiple radio access networks employing various radio access schemes, the system comprising:

a spectrum relay apparatus, wherein the spectrum relay apparatus calculates each frequency bandwidth to be allocated to the networks in consideration of priorities of the networks and priorities of service classes of each network, when a sum of frequency bandwidths requested from spectrum managers managing frequency resources for the networks is larger than an entire remaining bandwidth of the spectrum relay apparatus, and reports results of the calculation to corresponding spectrum managers;

conducts negotiation among the spectrum managers for a portion of the entire remaining bandwidth when the spectrum managers request an auction for frequency bandwidth allocation in response to results of the calculation, and allocates the entire remaining bandwidth to the spectrum managers according to a result of the negotiation;

makes a portion of the entire remaining bandwidth available for auction to the spectrum managers when the negotiation does not result in an agreement, and allocates the entire remaining bandwidth to the spectrum managers according to a result of the auction; and allocates the frequency bandwidth to the spectrum managers according to the result of the calculation when no spectrum manager requests the auction in response to the result of the calculation.

2. The system as claimed in claim 1, wherein the spectrum relay apparatus manages the entire remaining bandwidth by dividing the entire remaining bandwidth into a shared frequency bandwidth and an auction frequency bandwidth, and performs the negotiation and auction for the auction frequency bandwidth when an auction is requested.

3. The system as claimed in claim 1, wherein frequency bandwidths to be allocated to the networks are calculated $$B_k = R_k \frac{\sum_{j=1}^{C} a_{kj} L_{kj}}{\sum_{k=1}^{N} \sum_{j=1}^{C} a_{kj} L_{kj}} B_T$$

wherein, $B_k$ represents a frequency bandwidth to be allocated to a spectrum manager 'k', $R_k$ represents a priority of the spectrum manager 'k' for frequency resource allocation, $a_{kj}$ represents a priority of service class 'j' of the spectrum manager 'k' for frequency resource allocation, $L_{kj}$ represents an estimated load value for service class 'j' of the spectrum manager 'k', $B_T$ represents the entire remaining bandwidth managed by the spectrum relay apparatus, N represents the number of spectrum managers, and C represents the number of service classes.

4. The system as claimed in claim 3, wherein the spectrum relay apparatus periodically updates the value of $R_k$.

5. The system as claimed in claim 1, wherein the spectrum relay apparatus allocates as many frequency bandwidths as requested by the spectrum managers to corresponding spectrum managers, when the sum of the requested frequency bandwidths is smaller than the entire remaining bandwidth.

6. The system as claimed in claim 1, wherein a spectrum manager calculates an entire amount of frequency bandwidth required for a network managed by the spectrum manager by using load values according to service classes of the network, requests the spectrum relay apparatus to allocate the calculated entire amount of frequency bandwidth to the spectrum manager, and allocates a frequency bandwidth allocated from the spectrum relay apparatus according to the load values of service classes.

7. A system for managing frequency resources in a communication environment including multiple radio access networks employing various radio access schemes, the system comprising:

local resource managers for managing load values according to service classes by each network;

spectrum managers for receiving the load values according to service classes from the local resource managers of networks employing the same radio access scheme from among the networks, calculating a sum of frequency bandwidths corresponding to the received load values, and requesting a frequency bandwidth corresponding the sum to be allocated; and a spectrum relay apparatus for calculating frequency bandwidths to be allocated to the spectrum managers for frequency bands requested from the spectrum managers in consideration of priorities of the networks and priorities of service classes of each network, and allocating frequency bandwidths to the spectrum managers through negotiation and auction among the spectrum managers according to a result of the calculation.

8. The system as claimed in claim 7, wherein the spectrum relay apparatus calculates each frequency bandwidth to be allocated to the networks in consideration of priorities of the networks and priorities of service classes of each network, when a sum of frequency bandwidths requested from the spectrum managers is larger than an entire remaining bandwidth of the spectrum relay apparatus, and reports results of the calculation to corresponding spectrum managers, respectively;

conducts negotiation among the spectrum managers for a portion of the entire remaining bandwidth when the spectrum managers request an auction for frequency bandwidth allocation in response to results of the calculation, and allocates the entire remaining bandwidth to the spectrum managers according to a result of the negotiation;

makes a portion of the entire remaining bandwidth available for auction to the spectrum managers when the negotiation does not result in an agreement, and allocates the entire remaining bandwidth to the spectrum managers according to a result of the auction; and allocates the frequency bandwidth to the spectrum managers according to the result of the calculation when no spectrum manager requests the auction in response to the result of the calculation.

9. The system as claimed in claim 8, wherein the spectrum relay apparatus manages the entire remaining bandwidth by dividing the entire remaining bandwidth into a shared frequency bandwidth and an auction frequency bandwidth, and performs the negotiation and auction for the auction frequency bandwidth when an auction is requested.

10. The system as claimed in claim 8, wherein the spectrum relay apparatus allocates as many frequency bandwidths as requested by the spectrum managers to corresponding spectrum managers, when the sum of the requested frequency bandwidths is smaller than the entire remaining bandwidth.

11. The system as claimed in claim 7, wherein frequency bandwidths to be allocated to the networks are calculated by $$B_k = R_k \frac{\sum_{j=1}^{C} \alpha_{kj} L_{kj}}{\sum_{k=1}^{N} \sum_{j=1}^{C} \alpha_{kj} L_{kj}} B_T$$

wherein, $B_k$ represents a frequency bandwidth to be allocated to a spectrum manager 'k', $R_k$ represents a priority of the spectrum manager 'k' for frequency resource allocation, $a_{kj}$ represents a priority of service class 'j' of the spectrum manager 'k' for frequency resource allocation, $L_{kj}$ represents an estimated load value for service class 'j' of the spectrum manager 'k', $B_T$ represents the entire remaining bandwidth managed by the spectrum relay apparatus, N represents the number of spectrum managers, and C represents the number of service classes.

12. The system as claimed in claim 11, wherein the spectrum relay apparatus periodically updates the value of $R_k$.

13. A method for managing frequency resources in a frequency resource management system in a communication environment including multiple radio access networks employing various radio access schemes, the method comprising the steps of:

calculating each frequency bandwidth to be allocated to the networks in consideration of priorities of the networks and priorities of service classes of each network when a sum of frequency bandwidths requested from managers of corresponding networks is larger than an entire remaining bandwidth of the system, and reporting results of the calculation to corresponding managers;

conducting negotiation among the managers for a portion of the entire remaining bandwidth when the managers request an auction for frequency bandwidth allocation in response to results of the calculation, and allocating the entire remaining bandwidth to the managers according to a result of the negotiation;

making a portion of the entire remaining bandwidth available for auction to the managers when the negotiation does not result in an agreement, and allocating the entire remaining bandwidth to the managers according to a result of the auction; and allocating the frequency bandwidth to the managers according to the result of the calculation when no manager requests the auction in response to the result of the calculation.

14. The method as claimed in claim 13, wherein the entire remaining bandwidth is divided and managed into a shared frequency bandwidth and an auction frequency bandwidth, and the negotiation and auction for the auction frequency bandwidth are performed when an auction is requested.

15. The method as claimed in claim 13, wherein frequency bandwidths to be allocated to the networks are calculated by $$B_k = R_k \frac{\sum_{j=1}^{C} \alpha_{kj} L_{kj}}{\sum_{k=1}^{N} \sum_{j=1}^{C} \alpha_{kj} L_{kj}} B_T$$

wherein, $B_k$ represents a frequency bandwidth to be allocated to a manager 'k', $R_k$ represents a priority of the manager 'k' for frequency resource allocation, $a_{kj}$ represents a priority of service class 'j' of the manager 'k' for frequency resource allocation, $L_{kj}$ represents an estimated load value for service class 'j' of the manager 'k', $B_T$ represents the entire remaining bandwidth, N represents the number of managers, and C represents the number of service classes.

16. The method as claimed in claim 15, wherein the value of $R_k$ is periodically updated.

17. The method as claimed in claim 13, further comprising a step of allocating as many frequency bandwidths as requested by the managers to corresponding managers when the sum of the frequency bandwidths requested from the managers is smaller than the entire remaining bandwidth.

* * * * *